United States Patent [19]
Burg et al.

[11] 3,980,734

[45] Sept. 14, 1976

[54] THERMOPLASTIC MOULDING COMPOSITIONS BASED ON POLY(OXYMETHYLENE)

[75] Inventors: Karlheinz Burg, Langenhain, Taunus; Rudolf Kern, Mainz; Heinz Schmidt, Frankfurt am Main, all of Germany

[73] Assignee: Hoechst Aktiengesellschaft, Frankfurt am Main, Germany

[22] Filed: May 21, 1975

[21] Appl. No.: 579,472

Related U.S. Application Data

[63] Continuation of Ser. No. 376,232, July 3, 1973, abandoned.

[30] Foreign Application Priority Data

July 6, 1972  Germany.............................. 2233143

[52] U.S. Cl................................. 260/860; 260/823; 260/836; 260/837 R; 260/849; 260/850; 260/854; 260/857 F; 260/858; 260/874; 260/887; 260/895; 260/897 R; 260/897 B; 260/901

[51] Int. Cl.²..................... C08L 67/00; C08L 23/00

[58] Field of Search................. 260/823, 860, 897 R

[56] References Cited

UNITED STATES PATENTS

| | | |
|---|---|---|
| 3,519,696 | 7/1970 | Cherdron............................ 260/823 |
| 3,627,850 | 12/1971 | Hafner................................. 260/823 |
| 3,631,124 | 12/1971 | Burg................................... 260/823 |
| 3,704,275 | 11/1972 | Burg.............................. 260/37 AL |
| 3,793,303 | 2/1974 | Amann........................... 260/67 FP |
| 3,795,715 | 3/1974 | Cherdron............................ 260/823 |

*Primary Examiner*—Paul Lieberman
*Attorney, Agent, or Firm*—Curtis, Morris & Safford

[57] ABSTRACT

Branched or crosslinked poly(exymethylenes) are suitable as nucleating agents for linear poly(oxymethylenes). For ameliorating the mechanical properties of shaped articles, being prepared of such moulding compositions which contain nucleating agents, high molecular weight polymers are used having a certain softening point, second order transition temperature and particle size, and which are blended into the moulding compositions. The modified moulding compositions can be processed in the thermoplastic state and are suitable as industrially useful materials for preparing semi-finished articles and finished products.

13 Claims, No Drawings

THERMOPLASTIC MOULDING COMPOSITIONS BASED ON POLY (OXYMETHYLENE)

This is a continuation of application Ser. No. 376,232, filed July 3, 1973, now abandoned.

It is well known that poly(oxymethylenes) (=POM) have a strong tendency to crystallization. Even with slight cooling of the melt, a fast growth of spherulites is observed, which are mostly much larger than the wave length of light, imparting to the material a considerable opacity. Moreover, the crystallization process causes numerous microscopically small crazes to form within and at the surface of the material and build internal stresses. These crazes and internal stresses are detrimental to the mechanical properties of shaped articles, such as injection moulded parts, made of poly(oxymethylene). The bigger the size of the individual spherulites, the more distinctively apparent are the afore described flaws.

Furthermore, it is also known that by adding from 0.0001 to 0.5 wt. % of talcum to high molecular weight poly(oxymethylenes) and by evenly distributing the inorganic nucleating agent in the organic material, the crystal structure of injection moulded shaped articles may be rendered more uniform and thus the coarse-spherulite structures with average spherulite diameters of 100 microns be transformed into homogeneous structures having spherulite diameters of from 4 to 8 microns (cf. German "Auslegeschrift" No. 1 247 645). Since the samples are injection moulded articles, the above size indications refer to products being crystallized under pressure at temperatures of between 50° to 100°C.

Moreover, thermoplastic moulding compositions of poly(oxymethylenes) are known, having reduced specific viscosities between 0.07 and 2.5 dl.g$^{-1}$ and crystallite melting points between 140° and 180°C, and containing an inorganic nucleating agent in a quantity ranging between 0.0005 and 1.0 wt.%, calculated on the total mixture. They are characterized in that poly (oxymethylene)-spherulites of diameters from 30 to 250 microns are formed during isothermic crystallization of the moulding composition performed under a pressure of 1 atmosphere and at a temperature of 150°C (cf. Austrian Patent 295 851).

Furthermore mixtures of polyolefines with ethylene/vinylacetate copolymers, mixtures of poly(vinylchloride) with said copolymers and mixtures of polyethylene with ethylene/acrylic ester copolymers have been described, of which the impact strength of the thermoplastic starting materials had been ameliorated by adding a rubber-like polymer (cf. French Pat. No. 1.287.912, Belgian Pat. No. 609 574 and U.S. Pat. No. 2,953,541). A similar process permits the preparation of polystyrenes having a good impact strength, i.e., by adding polydiene-rubbers, for example polybutadiene or butadiene/acrylonitrile-copolymers to polystyrene during or after the polymerization process (cf. "Makromolekulare Chemie" vol 101, pg. 296 (1967)).

By working a rubber-elastic phase into the hard phase of the said polymer mixtures, their hardness decreases - compared to the starting material which may be devoid of impact strength (cf. e.g. Chemistry and Industry 1966, page 1399).

Finally, it is also known, that the impact strength of poly(oxymethylenes) may be ameliorated by incorporating as a second polymer phase, polymers with second order transition temperatures below +30°C as a disperse phase, the particle size of the dispersed polymers ranging between 0.1 and 5 microns (cf. Belgian Pat. No. 734 332). However, a loss of hardness and rigidity of the shaped articles made of said materials must be accepted.

It is an object of the present invention to provide thermoplastic moulding compositions, consisting essentially of a mixture of 99.999 to 90 wt. % of a linear poly(oxymethylene) and 0.001 to 10 wt. % of a branched or crosslinked poly(oxymethylene) and, additionally, another 0.1 to 10 wt. % — calculated on the total mixture — of a polymer having an average molecular weight of from 1,000 to 1,000,000, the softening point of which is below the crystallite melting point of the said poly(oxymethylene), the second order transition temperature of which is −120° to +30°C and which is present in the mixture as particles having diameters from 0.1 to 5 microns.

A further object of the present invention is a process for preparing thermoplastic moulding compositions on the basis of poly(oxymethylene), wherein 99,999 to 90 wt. % of a linear poly(oxymethylene) and 0.001 to 10 wt. % of a branched or crosslinked poly(oxymethylene) are blended with 0.1 to 10 wt. % — calculated on the total mixture — of a polymer having an average molecular weight of 1,000 to 1,000,000, the softening point of which is below the crystallite melting point of the said poly(oxymethylene), the second order transition temperature of which ranges between −120° and +30°C and which is present in the mixture as particles having diameters between 0.1 and 5 microns.

The moulding compositions according to the invention are prepared most suitably in such a way, that the individual components are blended together with the usual stabilizers against oxidation, heat and light, by means of a fast rotating mixing device (about 1,000 to 2,000 revolutions/minute) and then processed further to granules in an extruder, at temperatures of from 150°C to 240°C preferably from 170° to 220°C.

From the granules thus obtained, a film about 10 microns thick is produced under set conditions (see examples), which permits determination of the size of the particles of the polymer dispersed in the poly(oxymethylene) by means of a phase contrast microscope. The particle size of the disperse phase depends on numerous parameters, such as kind and concentration of the polymers to be blended, mixing temperature, melt viscosity of the polymers and characteristics of the mixing device.

Therefore, it has proved to be useful to control and optimize the mixing conditions to produce a desired particle size by means of the said microscopical technique.

The linear poly(oxymethylenes) used in the moulding composition according to the invention are obtained by known methods and represent homopolymers of formaldehyde or of trioxane or copolymers of trioxane and of at least one compound reacting monofunctionally and being copolymerizable with trioxane.

The branched or crosslinked poly(oxymethylenes) used according to the invention may be obtained a. by copolymerization of trioxane with at least one compound reacting multifunctionally and being copolymerizable with trioxane and, optionally, with at least one compound monofunctionally reacting and copolymerizable with trioxane, or b. by branching or crosslinking reactions performed subsequently with a linear poly(oxymethylene) having lateral or chainlinked functional groups, or c. by copolymerization of trioxane with at least one compound reacting monofunctionally and being copolymerizable with trioxane and a branched or crosslinked polyether or by reaction of a linear poly(oxymethylene) with a branched or crosslinked polyether.

The portion of the linear poly(oxymethylene) in the moulding compositions according to the invention amounts, preferably, to 99,99 to 95 wt. %, whilst the portion of the branched or crosslinked poly(oxymethylene) according to (a) and (b) amounts, preferably, to 0.01 to 5 wt. %. Particularly good characteristics are shown by moulding compositions consisting of 99.9 to 98 wt. % of the linear polymer and 0.1 to 2 wt. % of the branched or crosslinked polymer according to (a) and (b).

Moulding compositions according to the invention with branched or crosslinked poly(oxymethylenes) according to (c) comprise, preferably, 99.9 to 95 wt % of the linear poly(oxymethylene) and 0.1 to 5 wt. % of the branched or crosslinked poly(oxymethylene). Particularly good characteristics are shown by moulding compositions according to the invention with branched or crosslinked poly(oxymethylenes) according to (c) comprising 99.5 to 97 wt. % of the linear poly(oxymethylene) and 0.5 to 3 wt. % of the branched or crosslinked poly(oxymethylene).

In case of branched or crosslinked poly(oxymethylenes) with a low melt index, a satisfactory nucleating effect is generally obtained already when using smaller quantities than those necessary in case of poly(oxymethylenes) with a higher melt index.

By homopolymers of formaldehyde or of trioxane are to be understood such homopolymers of formaldehyde or of trioxane, the hydroxyl-terminal groups of which are chemically stabilized for instance by means of esterification or etherification to prevent degradation.

When using linear trioxane-copolymers the comonomers for trioxane best suited are cyclic ethers having from 3 to 5, preferably 3 ring members and cyclic acetals other than trioxane having from 5 to 11, preferably from 5 to 8 ring members, and linear polyacetals, in quantities of 0.1 to 20, preferably from 0.5 to 10 wt. % each. The most appropriate are copolymers of 99 to 95 wt. % of trioxane and 1 to 5 wt. % of one of the afore described cocomponents.

As cyclic ethers and cyclic acetals compounds having the formula (I)

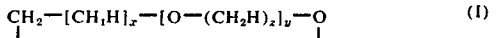
(I)

are used wherein $R_1$ and $R_2$ are identical or different and each represents a hydrogen atom, an aliphatic alkyl radical with 1 to 6, preferably 1 to 3 carbon atoms and possibly containing from 1 to 3 halogen atoms, preferably chlorine atoms, or a phenyl radical, $x$ is either an integer from 1 to 3 and $y$ is zero, or $x$ is zero, $y$ is an integer from 1 to 3 and $z$ is 2, or $x$ is zero, $y$ is 1 and $z$ is an integer from 3 to 6, preferably 3 or 4, or wherein $R_1$ represents an alkoxymethyl radical having from 2 to 6, preferably from 2 to 4 carbon atoms or a phenoxymethyl radical, $x$ being 1, $y$ being zero and $R_2$ having the aforesaid meaning.

Particularly appropriate as cyclic ethers and cyclic acetals are compounds having the formula (II)

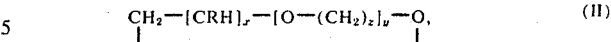
(II)

wherein R represents a hydrogen atom, an aliphatic alkyl radical having from 1 to 6, preferably from 1 to 3 carbon atoms which may comprise from 1 to 3 halogen atoms, preferably chlorine atoms, or wherein R represents a phenyl radical, $x$ represents either an integer from 1 to 3 and $y$ is zero, or $x$ is zero, $y$ represents an integer from 1 to 3 and $z$ is 2 or $x$ is zero, $y$ is 1 and $z$ represents an integer from 3 to 6, preferably 3 or 4, or wherein R represents an alkoxymethyl radical having from 2 to 6, preferably from 2 to 4 carbon atoms or a phenoxymethyl radical, $x$ being 1 and $y$ being zero.

Especially preferred as cyclic ethers andd cyclic acetals are compounds having the formula (III)

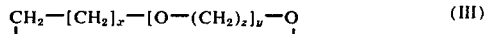
(III)

wherein $x$ is either an integer from 1 to 3 and $y$ is zero, or wherein $x$ is zero, $y$ is an integer from 1 to 3 and $z$ is 2, or wherein $x$ is zero, $y$ is 1 and $z$ is an integer from 3 to 6, preferably 3 or 4.

Best suited cyclic ethers are especially those having three ring members such as ethylene oxide, styrene oxide, propylene oxide and epichlorhydrin, as well as phenyl-glycidyl ether.

Particularly appropriate cyclic acetals are cyclic formals of aliphatic or cycloaliphatic α,ω-diols having from 2 to 8, preferably from 2 to 4 carbon atoms, the carbon chain of which may be interrupted by one oxygen atom in intervals of 2 carbon atoms each, for example glycol formal (1,3-dioxolane), butanediol formal (1,3-dioxepane) and diglycol formal (1,3,6-trioxocane) as well as 4-chloromethyl-1,3-dioxolane and hexanediol formal (1,3-dioxonane).

Appropriate linear polyacetals are as well homopolymers or copolymers of the above specified cyclic acetals as linear condensates of aliphatic or cyclo-aliphatic α,ω-diols with aliphatic aldehydes or thioaldehydes, preferably formaldehyde. Especially useful are homopolymers of formals of aliphatic α,ω-diols having from 2 to 8, preferably from 2 to 4 carbon atoms, such as polydioxolane, poly(1,3-propanediolformal) and poly(1,4-butanediolformal).

The reduced specific viscosity (RSV) values of the linear poly(oxymethylenes) used according to the invention (measured in butyrolactone, containing 2 wt. % of diphenylamine, at 140°C at concentration of 0.5 g/100 ml) range between 0.07 and 2.50 dl. g$^{-1}$, preferably between 0.14 and 1.20 dl. g$^{-1}$. The crystallite melting points of the poly(oxymethylenes) are in the range of from 140° to 180°C, their densities from 1.38 to 1.45 g. ml$^{-1}$ (measured according to German Standards DIN 53 479).

The linear, preferably binary or ternary trioxane-copolymers according to the invention, are prepared in known manner by polymerization of the monomers, cationically efficient catalysts being present, at temperatures of from 0° to 100°C, preferably from 50° to 90°C (cf. for instance German "Auslegeschrift" 1 420 283). The catalysts used for this process are e.g. Lewis acids such as boron trifluoride and antimony pentafluoride, and complex compounds of Lewis acids, preferably etherates such as boron trifluoride diethyl etherate and boron trifluoride-di-tert.-butyletherate. Further appropriate catalysts are protonic acids, such as perchloric acid, as well as salt-like compounds, such as triphenylmethylhexafluorophosphate, triethyloxoniumtetrafluoroborate, or acetylperchlorate. The polymerization may be performed in bulk in suspension or in solution. In order to eliminate unstable portions, it is useful to submit the copolymers to a thermal or hydrolytic, controlled, partial degradation to form primary alcohol terminal groups (cf. e.g. German "Auslegeschriften" 1,445,273 and 1,445,294).

The homopolymers of formaldehyde or of trioxane according to the invention are also prepared in known manner by catalytic polymerization of the monomers (cf. e.g. German "Auslegeschrift" 1,037,705 and German Pat. No. 1,137,215).

In the process of preparing according to (a) the branched or crosslinked poly(oxymethylenes) of the invention by copolymerization of trioxane with at least one compound copolymerizable with trioxane and reacting multifunctionally, and, optionally, with at least one compound reacting monofunctionally with trioxane, the multifunctional compounds involved are generally used in quantities of 0.01 to 5, preferably from 0.05 to 2 wt. % and the monofunctional compounds involved are generally used in quantities from 0.1 to 10, preferably from 1 to 5 wt. %.

Cyclic ethers, cyclic acetals and linear polyacetals are used as compounds reacting monofunctionally, such as same are mentioned above in the description of the preparation of linear trioxane copolymers according to the invention.

As compounds reacting multifunctionally, there are used monomeric or oligomeric compounds which contain at least one of the above mentioned monofunctional cyclic ether groups or cyclic acetal groups and which further contain no, only one or several linear acetal groups, whereby the total number of the specified reactive cyclic ether, cyclic acetal and linear acetal groups is, however, at least two. Preference is given to the use of alkyl glycidyl formals, polyglycol diglycidyl ethers, alkanediol diglycidyl ethers and bis(alkanetriol)triformals.

By alkyl glycidyl formals are to be understood compounds having the formula (IV)

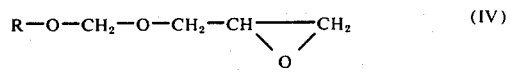

wherein R represents an aliphatic alkyl radical having from 1 to 10, preferably from 1 to 5 carbon atoms. Particularly well appropriate are alkylglycidyl formals of the said formula, wherein R represents a linear, low aliphatic alkyl radical, such as methyl glycidyl formal, ethyl glycidyl formal, propyl glycidyl formal and butyl glycidyl formal.

Compounds having the formula V

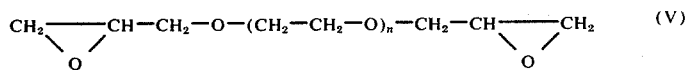

are defined as polyglycol diglycidyl ethers, wherein $n$ represents an integer from 2 to 5. Especially appropriate are polyglycol diglycidyl ethers of the said formula, wherein $n$ represents 2 or 3, e.g. diethylene glycol diglycidyl ether and triethylene glycol diglydicyl ether.

Compounds of the formula (VI)

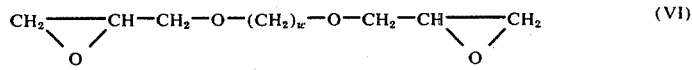

are defined as alkane diol diglycidyl ethers, wherein $w$ represents an integer from 2 to 6, preferably from 2 to 4. Particularly appropriate is butane diol diglycidyl ether.

By bis(alkanetriol)-triformals are to be understood compounds with one linear and two cyclic formal groups, especially compounds having the formula (VII)

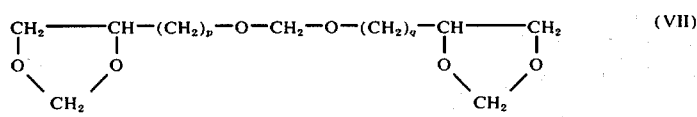

wherein $p$ and $q$ represent each an integer from 3 to 9, preferably 3 to 4. Particularly appropriate are symmetrical bis(alkanetriol)-triformals of the said formula, wherein $p$ and $q$ represent the same integer, such as bis(1,2,5-pentanetriol)-triformal and, preferably, bis(1,2,6-hexanetriol)-triformal.

It is also possible to use oligomeric formals, as compounds reacting multifunctionally, for preparing branched or crosslinked poly(oxymethylenes); these oligomeric formals are obtained by reaction of 1 mole of a 1,2,(5-11)-triol with 0 to 1 mole of an α,ω-diol having a molecular weight from 62 to 1,000, 0 to 1 mole of a monohydric alcohol having from 1 to 11 carbon atoms and 1 mole of formaldehyde for 2 moles each of hydroxyl groups of the reaction mixture (cf. German Patent 1,238,889).

The copolymerization of trioxane with the specified multifunctionally or monofunctionally reacting compounds is performed in the same manner as already described for the preparation of the linear trioxane copolymers. The elimination of unstable chain ends may generally be achieved according to the methods known for stabilizing the terminal groups of trioxane copolymers. It is, however, also possible to use directly as a nucleating agent the branched or crosslinked poly(oxymethylenes) ground to powder without any further treatment.

A further possibility for preparing these branched or crosslinked poly(oxymethylenes) consists of the reaction of linear poly(oxymethylenes) with the aforesaid multifunctional compounds, while using cationic catalysts and, preferably, inert, diluents, such as cyclohexane, n-hexane or methylene chloride.

The linear or crosslinked poly(oxymethylenes) according to (b) are obtained by intermolecular reaction of linear poly (oxymethylenes) with lateral or chain-linked functional groups, optionally, after having chemically transformed these groups into other functional groups and, optionally, bifunctional crosslinking agents being present.

The aforesaid poly(oxymethylenes) with lateral or chain-linked functional groups are prepared by polymerization of a mixture of 99.9 to 60, preferably from 99.7 to 80 wt % of trioxane, from zero to 20, preferably from 0.1 to 10 wt. % of a cyclic ether having from 3 to 5 ring members or of a cyclic acetal, other than trioxane, having from 5 to 11 ring members or of a linear polyacetal, and 0.1 to 20, preferably 0.2 to 10 wt % of at least one multifunctionally reacting compound copolymerizable with trioxane. Particularly good results are obtained by use of from 1 to 5 wt. % of monofunctional compounds and of from 1 to 5 wt. % of multifunctional compounds.

For preparing the linear poly(oxymethylenes) containing functional groups, monomeric compounds are used as multifunctional compounds, which have — on the one hand — a functional group reacting under the polymerization conditions, and which — on the other hand — have at least one functional group which does not react under the polymerization conditions. Especially appropriate for this purpose are saturated cyclic ethers or acetals having aromatic or aliphatic substituents, which themselves carry at least one of such functional groups refraining from immediate reaction, or cyclic ethers or acetals being at least one time unsaturated. Preference is given to the use of aldehyde, hydroxy, nitro, or ester groups or halogen atoms containing epoxy compounds, e.g., o-, m- and p- glycidyloxybenzaldehyde, 3-methyl-4-glycidyloxybenzaldehyde 3-methoxy-4-glycidyloxybenzaldehyde, p-glycidyloxynitrobenzene, 2,4-dinitro-1-glycidyloxybenzene, 1,6-dinitro-2-glycidyloxynaphtalene, p-glycidyl-oxybenzoic acid methyl ester, epoxymethacrylic acid methyl ester, p-glycidyloxycinnamic acid methyl ester and epichlorhydrin. As unsaturated cyclic acetals there are especially used cyclic formals which are mono unsaturated and have more than 6, preferably 7 or 8 ring members, e.g. 1,3-dioxacycloheptene-(5), or cyclic formals with double bonds not being member of the ring, and with from 5 to 11, preferably from 5 to 8 ring members, such as 4-vinyldioxolane-(1,3) and 5-vinyl-1,3-dioxa-cyclohexane.

As unsaturated cyclic ethers are especially used cyclic ethers, having from 3 to 5 ring members and a double bond, not being member of the ring, e.g. butadiene-monoxide, dicyclopentadiene-monoxide and vinylcyclohexeneoxide (1-vinyl-3,4-epoxycyclohexane).

The polymerization is performed in known manner by polymerizing the monomers in the presence of cationically active catalysts at temperatures of from 0° to 100°C, preferably from 50° to 90°C (cf. e.g. Brit. Pat. No. 1,146,649, German "Offenlegungsschrift" 1,595,705, German "Offenlegungsschrift" 1,595,668, German Auslegeschrift 1,199,504, German Pat. No. 1 175 882). The elimination of unstable chain ends may, in principle, be performed according to methods known for stabilizing the terminal groups of trioxane copolymers.

The transformation of the linear poly(oxymethylenes) having lateral or chain-linked functional groups into branched or crosslinked poly(oxymethylenes) is performed, optionally, after chemical modification of the functional groups, either by direct reaction of the functional groups with each other or by reaction with bifunctional crosslinking agents. The transformation is carried out in solution, in suspension or, preferably, in the melt. Inert polar solvents are used e.g. benzyl alcohol, chlorobenzene, dimethyl formamide and — butyrolactone. As suspension agents are suitable inert aliphatic, cycloaliphatic, or aromatic hydrocarbons, having from 6 to 18 carbon atoms, such as hexane, cyclohexane and toluene.

The crosslinking is performed at temperatures of from 50° to 230°C. Preferably, in solution the temperatures are between 110° and 170°C, in suspension between 50° and 170°C, and in the melt between 150° and 230°C.

Also suitable are radiation induced reactions (cf. German "Auslegeschrift" 1,089,969 and 1,301,102).

Poly(oxymethylenes) containing aldehyde groups are linked together preferably by condensation with bifunctionally active crosslinking agents, especially with hydrazine, terephthalic acid dihydrazide, semicarbazide, dicyanodiamide, urea, thiourea, thioacetamide, ammonia, acetone, aliphatic and aromatic diamines, such as hexamethylene diamine and phenylene diamine, and diisocyanates, such as 4,4'-diisocyanatodiphenylmethane (cf. for instance, German "Auslegeschrift" 1,301,105). The presence of basic catalysts, e.g. piperidine, may be useful.

Poly(oxymethylenes) with lateral nitro groups are first transformed by known methods into others with lateral amino groups. Branched or crosslinked poly(oxymethylenes) are then obtained by linking these amino groups by suitable bifunctional agents such as dialdehydes (e.g. terephthalic-dialdehyde, glyoxal, glutaric dialdehyde), diisocyanates (e.g. hexane-1,6-diisocyanate, toluylene-diisocyanate, naphthalene-diisocyanate-(1,5) and 4,4'-diisocyanatodiphenylmethane) or dicarboxylic acid anhydrides (e.g. maleic acid anhydride, succinic acid anhydride, phthalic acid anhydride).

After having transformed the ester groups into free carboxylic groups (cf. Brit. Pat. No. 1,191,505), poly(oxymethylenes) having lateral ester groups are linked together by means of bifunctionally active crosslinking agents, particularly by diisocyanates, diamines (e.g. phenylene diamine, hexamethylene diamine), diols (e.g. butanediol-(1,4)), hydrazine or dihydrazides; it is also possible to induce a direct reaction of the unsaponified ester groups with diols, such as butanediol-(1,4), preferably in the presence of basic reesterification catalysts, e.g. sodium hydroxide.

Poly(oxymethylenes) with lateral hydroxyl groups, being obtained for instance by copolymerization of trioxane with epichlorhydrin and exchange of the chlorine atoms against hydroxyl groups by reacting the polymers with alkali metal hydroxide solutions at higher temperatures, are linked to each other by means of bifunctionally active crosslinking agents, such as diisocyanates, dicarboxylic acid anhydrides, dicarboxylic acid esters or diketene.

Poly(oxymethylenes) with lateral halogen atoms, preferably chlorine atoms, are transformed into branched or crosslinked poly(oxymethylenes) by direct reaction of the lateral halogen atoms with the alkali metal salts of organic compounds having at least two groups of slightly acid reaction per molecule, preferably with bisphenols, such as 4,4'-dihydroxydiphenyl-dimethyl-methane or 4,4'-dihydroxy-diphenyl-methane.

Linear poly(oxymethylenes) having chain-linked or lateral double bonds are transformed into branched or crosslinked poly(oxymethylenes) e.g. by reacting with sulphur or with 2-mercaptobenzthiazole, preferably in the melt.

It is furthermore possible that poly(oxymethylenes) having different reactive groups, are reacted with each other, for example those containing aldehyde groups with others having amino groups, so as to obtain crosslinked products. The preparation of the branched or crosslinked poly(oxymethylenes) according to c) consists in the polymerization of trioxane with branched or crosslinked polyethers, optionally in the presence of at least one compound known for the copolymerization with trioxane. For polymerization mixtures of 99.99 to 50, preferably of 99.8 to 70 wt. % of trioxane and from 0 to 20, preferably from 0.1 to 10% of at least one compound known for the copolymerization with trioxane, and from 0.01 to 30, preferably from 0.1 to 20 wt. % of a branched or crosslinked polyether are used. Best results are obtained with 98.5 to 85 wt. % of trioxane, 1 to 5 wt % of at least one compound known for the copolymerization with trioxane and 0.5 to 10 wt. % of a branched or crosslinked polyether.

As branched or crosslinked polyethers are used copolymers composed of at least one, preferably 2, monofunctionally reacting cyclic ethers having from 3 to 5 ring members and of a bifunctionally reacting cyclic ether, i.e. an aliphatic or cycloaliphatic compound, comprising two cyclic ether groups and having 3 to 5, preferably 3 or 4 ring members.

As monofunctionally reacting cyclic ether are preferably used compounds having the formula (VIII)

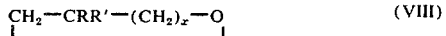

$$\mathrm{CH_2{-}CRR'{-}(CH_2)_x{-}O} \qquad (VIII)$$

wherein R and R' are identical or different and represent each a hydrogen atom, and aliphatic alkyl radical having 1 to 6, preferably 1 to 3 carbon atoms, and possibly containing 1 to 3 halogen atoms, preferably chlorine atoms, or wherein R and R' represent a phenyl radical and wherein x is zero, 1 or 2. As examples may be cited ethylene oxide, propylene oxide, isobutylene oxide, epichlorhydrin, oxacyclobutane, 3,3-bis(-chloromethyl)-oxacyclobutane and tetrahydrofurane.

As bifunctionally reacting cyclic ethers are especially used diglycidyl ethers of α,ω-diols having 2 to 8, preferably 2 to 4 carbon atoms, the carbon chain of which may be interrupted by an oxygen atom in intervals of 2 carbon atoms each, or diglycidyl ethers of bisphenols, or by an oxacyclobutyl radical doubly substituted aliphatic or cycloaliphatic hydrocarbons having 1 to 6 carbon atoms. As examples there may be cited 1,3-propanediol diglycidyl ether, 1,4-butanediol diglycidyl ether, glycol diglycidyl ether, diglycol diglycidyl ether, triglycol diglycidyl ether, 4,4'-bis-glycidoxy phenyl-dimethylmethane, 1,2-bis(3-oxycyclobutyl)-ethane, 1,4-bis(3-oxacyclobutyl)-butane and 2,9-dioxa-dispiro-[3.2.3.2.]-dodecane.

The portion of the monofunctionally reacting cyclic ethers amounts generally to from 99.99 to 98, preferably from 99.95 to 99 wt. %, whilst the portion of the bifunctionally reacting cyclic ethers is between 0.01 and 2, preferably between 0.05 and 1 wt. %.

The branched or crosslinked polyethers are generally prepared according to known methods by copolymerization of the monomers by means of cationic or anionic initiators. However, the polyethers may also be obtained by subsequently grafting or condensating linear polyethers.

The copolymerization of trioxane with the described branched or crosslinked polyethers and, optionally, with at least one compound known for the copolymerization with trioxane, is performed in the manner already indicated for preparing linear trioxane copolymers.

Furthermore, it is possible to incorporate branched or crosslinked polyethers into linear poly(oxymethylenes) by blending polyethers and poly(oxymethylenes), preferably in the presence of a solvent for polyethers, such as cyclohexane or methylene chloride, and induce same to react in the presence of cationically active catalysts at temperatures from 0° to 100°C, preferably from 50° to 90°C. The elimination of unstable portions and the chemical stabilization of hydroxyl terminal groups, is performed in a manner similar to that described above.

The branched or crosslinked poly(oxymethylenes) have melt indices $i_2$ from 0 to 50 g/10 min., preferably from 0 to 10 g/10 min. (measured according to German Industrial Standards DIN 53 735 at a temperature of 190°C and a load of 2.16 kg). The lower limit for $i_2$ of zero indicates that above a certain crosslinking degree the crosslinked poly(oxymethylenes) are no longer fusible or soluble, and then the melt indices or RSV values cannot be determined. Particularly appropriate are branched or crosslinked poly(oxymethylenes) having melt indices $i_2$ from 0.1 to 5 g/10 min.

Polymers, the softening point of which is below the crystallite melting point of the poly(oxymethylene) specifically concerned, preferably amounting to from +50° to +160°C, and the second order transition temperature of which ranges from −120° to +30°C, preferably from −80° to 0°C are particularly appropriate as additional modification components of the moulding compositions according to the invention.

Special use is made of homopolymers and copolymers of olefinically unsaturated compounds having the formula

$$\mathrm{H_2C{=}C}\begin{matrix}\diagup R_1 \\ \diagdown R_2\end{matrix}$$

wherein $R_1$ is a hydrogen atom or a methyl radical and wherein $R_2$ represents a hydrogen atom, a carboxylic group, an alkylcarboxy group having from 2 to 10, preferably from 2 to 5 carbon atoms, an acyloxy group having from 2 to 5, preferably 2 or 3 carbon atoms, or a vinyl radical.

As examples there may be cited:

1. Homopolymers and copolymers of α-olefins, such as polyethylene, ethylene/propylene-copolymers, ethylene/acrylic acid ester copolymers ethylene/methacrylic acid ester copolymers, ethylene/acrylic acid copolymers. Particularly appropriate are polyethylene, as well as copolymers of ethylene and vinyl acetate and copolymers of ethylene and acrylic acid esters having from 4 to 12, preferably from 4 to 7 carbon atoms, wherein the part by weight of ethylene is 40 to 90, preferably 50 to 80 percent.

2. Homopolymers and copolymers of 1,3-dienes having 4 or 5 carbon atoms, such as polybutadiene, polyisoprene, butadiene/styrene copolymers, butadiene/acrylonitrile copolymers.

3. Homopolymers and copolymers of vinyl esters, such as poly (vinyl-acetate), poly(vinylpropionate), and poly(vinylbutyrate).

4. Homopolymers and copolymers of acrylic acid esters and methacrylic acid esters, such as poly(ethylacrylate), poly(butylacrylate), poly(butylmethacrylate), poly(hexylmethacrylate), poly(2-ethylhexylmethacrylate) and poly (octylmethacrylate).

Polyethers and polyesters are used, moreover, as modifying mixing component. By polyethers are to be understood homopolymers and copolymers of cyclic ethers, such as poly(ethylene oxide), poly(propylene oxide), poly(3,3-dimethyloxetane). Especially suitable are ethylene oxide/propylene oxide copolymers as well as poly(tetrahydrofurane).

By polyesters are to be understood compounds of dibasic carboxylic acids and diols; suitable are especially polyesters of linear, aliphatic dicarboxylic acids having from 4 to 12 carbon atoms and $\alpha,\omega$-diols having from 2 to 8, preferably from 2 to 4 carbon atoms, such as sebacic acid/ethylene glycolpolyesters, sebacic acid/butanediol polyester.

The molecular weights of the polymeric mixing components may vary within broad ranges. Suitable products are those having molecular weights between 1,000 and 1,000,000, preferably between 1,000 and 300,000; particularly good results were obtained with mixing components having molecular weights from 5,000 to 150,000 (viscosimetric molecular weight average).

The concentration of the blended-in polymers is in the range of from 0.1 to 10, preferably 0.1 to 5 wt. % - calculated on the total mixture; especially good results are obtained with mixtures comprising from 0.3 to 3 wt. % of the dispersed polymer.

The diameters of the particles of the blended-in (disperse) phase range from 0.1 to 5 microns, preferably from 0.1 to 3 microns; particularly advantageous are polymers with particle diameters between 0.2 and 2 microns.

While blending the individual components, stabilizers against the actions of heat, oxygen and light may be added to the moulding compositions according to the invention. Suitable heat stabilizers are, for example, polyamides, amides of polybasic carboxylic acids, amidines, hydrazines, ureas, poly(N-vinyllactams) and alkaline earth metal salts of carboxylic acids. Phenols, especially bisphenols, and aromatic amines are used as oxydation stabilizers, whilst derivatives of α-hydroxybenzophenone and of benzotriazole make good light stabilizers. The stabilizers are used in quantities of totally 0.1 to 10, preferably 0.5 to 5 wt. % - calculated on the total mixture.

The presence of branched or crosslinked poly (oxymethylenes) and of additionally blended-in polymers, induces nucleation of the moulding compositions according to the invention, which is shown on the one hand by diminuation of the spherulite size, and on the other hand, ameliorates the mechanical properties of shaped articles made of the moulding compositions according to the invention. For example, an increased stiffness in torsion can be observed, though the ball indentation hardness remains the same, compared with an unmodified linear poly(oxymethylene) (see table). As an effect of the nucleation, the crystallization speed increases, which then permits acceleration of the processing speed. This higher processing speed shows particularly in shorter injection moulding cycles and in closer tolerances for injection moulded articles.

The moulding compositions according to the invention can be mechanically chopped or ground, e.g. to granules, snips, flakes or powder, and worked up thermoplastically e.g. by injection moulding or extrusion. They are a suitable industrially useful material for preparing semi-finished articles and finished products, such as shaped articles, e.g. bars, rods, plates, films, ribbons, tubes and hoses, as well as household articles, e.g. dishes and tumblers, and machinery parts of stable dimensions and shapes, e.g. cases, gear wheels, parts of bearings and steering elements.

The following examples illustrate the invention:

EXAMPLES

Different quantities of the individual components of the moulding compositions according to the invention were mixed thoroughly with 0.5 wt. % of bis(2-hydroxy-3-tert.butyl-5-methyl-phenyl)-methane and 0.1 wt. % of dicyanodiamide and homogenized at 200°C in a singly screw extruder. The residence time in the cylinder of the extruder amounted to about 4 minutes. The diameter of the particles of the modifying component was adjusted by variation of the extrusion conditions, e.g. temperature of the mass or number of revolutions of the screw.

From the products thus obtained, a film about 10 microns thick was prepared by melting the moulding composition between two glass plates at 180°C under a pressure of 200 kg cm$^{-2}$ and subsequent crystallization at 150°C under atmospheric pressure. The average spherulite size of the poly(oxymethylene) was determined under a polarizing microscope, whilst examination of the film by means of the phase contrast microscope determined the particle size of the modifying component.

Moreover, with the obtained products, plates having the dimensions of 60 × 60 × 2 mm were injection moulded at a mass temperature of 200°C and a temperature of the mould of 80°C; for testing the impact strength the plates were submitted to a drop test. This test was performed as follows: a plate was mounted on a frame and then submitted to a vertical impact blow by dropping from different heights with as little friction as possible — a drop hammer of a certain weight, the impact of which is shaped like a hemisphere and has a diameter of 2 cm. The height from which 50 % of the plates were destroyed is taken as a measurement of the impact strength (average value found in 40 drop tests). The ball indentation hardness of injection moulded test parts was measured according to VDE 0302 standards at a stress time of 10 seconds. 2 mm-pressed sheets were used for measuring the stiffness in torsion according to German Industrial Standards DIN 53 447, at a temperature of 120°C and a stress time of 60 seconds.

TABLE -continued

| Ex. | linear poly(oxymethylene) composition (wt.%) | RSV-value (dl. g⁻¹) | melt index (g/10 min) | branched or crosslinked poly(oxymethylene) composition (wt.%) | melt index (g/10 min) | quantity (wt.%) | modifying component composition (wt.%) | melt index (g/10 min) | molecular weight | second order transition temp °C | particle size (microns) | quantity (wt.%) | indentation hardness (kg. cm⁻²) | stiffness in torsion cm⁻² | impact strength hammer wt. (g) | drop-ring wt. (cm) | spherulite size μsize |
| --- | --- | --- | --- | --- | --- | --- | --- | --- | --- | --- | --- | --- | --- | --- | --- | --- | --- |
| 9 | Cop. TO/DO (97/3) | 0.70 | 9.3 | POM IV | 0.5 | 0.5 | poly(2-ethylhexyl-methacrylate) | — | 110,000 | −50 | 0.1) 0.5–5 | 3 | 1400 | 1440 | 200 | 170 | 12 |

The table uses the following abbreviations:

| | | | | |
| --- | --- | --- | --- | --- |
| Cop. | = Copolymer | | Vina | = Vinyl acetate |
| TO | = 1,3-Trioxane | | EA | = Ethyl acrylate |
| EO | = Ethylene oxide | | BDGE | = 1,4-Butanediol-diglycidyl ether |
| DO | = 1,3-Dioxolane | | MGF | = Methylglycidylformal |
| PO | = Propylene oxide | | AN | = Acrylonitrile |

The branched or crosslinked poly(oxymethylenes) POM I, POM II, POM III and POM IV were prepared as follows:

POM I

A mixture of 1,000 g of trioxane, 20 g of ethylene oxide and 30 g of p-glycidoxy-cinnamic acid methyl ester was admixed with 35 ml of a catalyst solution of 1 volume part of BF$_3$-dibutyl-di-n-butyletherate in 40 volume parts of cyclohexane. The mixture was polymerized in a closed recipient with a layer thickness of 0.8 cm in a thermally stable bath having a temperature of 70°C. The polymerization time was 30 minutes. The obtained polymer block was ground and, for eliminating the instable semi-acetal terminal groups and the remaining monomers, submitted to further treatment in benzyl alcohol containing 1 wt. % of triethanolamine, for 30 minutes at 150°C. After cooling off, the polymer was separated by suction filtration, boiled thoroughly several times with methanol and then dried under reduced pressure at a temperature between 50° and 70°C. The polymer yield was 670 g, the RSV value of which was 0.78 dl. g⁻¹ and the $i_2$-value 1.27 g/10 min. Subsequently, the obtained polymer was ground and submitted to 10 hours of radiation by a xenon testlamp. From now on, a RSV value could not be detected any more, since only a small portion of the polymer was still soluble in butyrolactone. The melt index $i_2$ amounted to 0.77 g/10 min.

POM II 10 g of a copolymer prepared of 1,000 g of trioxane, 20 g of ethylene oxide and 50 g of p-glycidoxy-benzaldehyde were treated in 350 ml of benzyl alcohol for 30 minutes at 120°C with 0.3 ml of a hydrazine hydrate solution of 80 wt.% strength. This treatment modified the melt index of the polymer from $i_2$ = 156 g/10 min. to $i_2$ = 1.0 g/10 min.

POM III

As described for POM I, a mixture of 900 g of trioxane and 100 g of epichlorhydrin was polymerized with the use of 5 g of a mixture consisting of 20 volume parts of cyclohexane and 1 volume part of boron trifluoride-di-n-butyletherate. The obtained polymer block was ground and the powder was boiled thoroughly in methanol for 30 minutes. After suction filtration and drying at 50°C under nitrogen, a polymer powder was obtained having a RSV value of 0.64 dl.g⁻¹ and containing chlorine at a rate of 4.1 wt. %.

100 g of this polymer were stirred in an autoclave for 2 hours at 155°C under nitrogen, with 100 g of potassium hydroxide, 1,700 g of water, and 3,300 g of methanol. The mass remaining after cooling was ground and boiled thoroughly with methanol several times. After drying at 50°C under flowing nitrogen, 60 g of a slightly yellowish powder were obtained, the infra-red spectrum of which was showing distinct hydroxyl bands.

25 g of this polymer, containing hydroxyl groups, were melted at 190°C under nitrogen in a Brabender plastograph, together with 125 mg of bis(2-hydroxy-3-tert.-butyl-5-methylphenyl)-methane and 25 mg of dicyanodiamide. After having added 200 mg of 1,4-diazabicyclo-[2,2,2]octane, a total of 500 mg of 4,4'-diisocyanatodiphenyl-methane were added in small portions during a 5 minutes period. The melt viscosity of the mass increased heavily in course of this processing phase. After another lapse of 5 minutes, the mass was allowed to cool. The $i_2$ value of the product amounted to 0.1 g/10 min.; measuring of the viscosity was not possible, due to the insolubility of the polymer in butyrolactone.

POM IV

To a mixture of 95 g of trioxane and 5 g of p-glycidoxynitrobenzene was added a quantity of 0.7 ml of a catalyst solution of 1 volume part of BF$_3$-dibutyletherate in 40 volume parts of cyclohexane and, as described for POM I, the mixture was polymerized and worked up, with the difference, however, of the polymerization period being here 60 minutes. The washed and dried polymer powder was dissolved at 120° to 130°C in 2 l of benzyl alcohol, to which were added 50 ml of an aqueous hydrazine hydrate solution having a strength of 80 wt. % and after completion of the dissolution a very small quantity of Raney nickel was added. The reaction mixture was kept at a temperature of 120° to 130°C for 30 minutes. After cooling, the polymer was separated by suction filtration, then boiled thoroughly with methanol and dried under reduced pressure at 50° to 70°C. The yield in polymer containing amino groups amounted to 77 g, its melt index being 15.7 g/10 min.

The melt index $i_2$ was measured according to DIN 53 735, at a temperature of 190°C and under a load of 2.16 kg. For measuring the reduced specific viscosity (=RSV value; $\eta_{red}$) a solution of 0.5 g of polymer in 100 ml of butyrolactone, comprising 2 wt. % of diphenylamine, was used at a temperature of 140°C.

To characterize the moulding compositions according to the invention, the following table indicates in each case the amount and the chemical composition of the linear poly(oxymethylene), of the branched or crosslinked poly(oxymethylene) and of the modifying mixing component, the melt viscosity of the individual components or their molecular weight or, as well, their reduced specific viscosity, the second order transition temperature and the particle diameter of the dispersed mixing components, the spherulite size of the poly(oxymethylene), the ball indentation hardness, the stiffness in torsion and the dropping height.- The examples A to F represent comparative examples.

TABLE

| Ex. | linear poly(oxymethylene) composition (wt.%) | RSV-value (dl. g⁻¹) | melt index (g/10 min) | branched or crosslinked poly(oxymethylene) composition (wt.%) | melt index (g/10 min) | quantity (wt.%) | modifying component composition (wt.%) | melt index (g/10 min) | molecular weight | second order transition temp °C | particle size (microns) | quantity (wt.%) | indentation hardness (kg. cm⁻²) | stiffness in torsion cm⁻² | impact strength hammer wt. (g) | dropping wt. (cm) | spherulite size μ |
|---|---|---|---|---|---|---|---|---|---|---|---|---|---|---|---|---|---|
| A | formaldehyde homopolymer acetylized. | 0.69 | 8.9 | — | — | — | — | — | — | — | — | — | 1640 | 2000 | 500 200 | 10 13 | 482 |
| B | Cop. TO/EO (98/2) | 0.73 | 9.0 | — | — | — | — | — | — | — | — | — | 1430 | 1360 | 500 200 | 10 13 | 521 |
| C | Cop. TO/EO (98/2) | 0.64 | 27.0 | — | — | — | — | — | — | — | — | — | 1440 | 1380 | 500 200 | 10 12 | 515 |
| D | Cop. TO/DO (97/3) | 0.70 | 9.1 | — | — | — | — | — | — | — | — | — | 1460 | 1390 | 500 200 | 10 14 | 434 |
| E | Cop. TO/EO (99/2) | 0.73 | 9.0 | — | — | — | Cop. ethylene vina (65/32) | 24 | — | −15 | 0.2–2 | 3 | 1350 | 1300 | 500 | 270 | 419 |
| F | Cop. TO/DO (97/3) | 0.70 | 9.1 | — | — | — | polyethylene | 8.6 | — | −80 | 0.5–5 | 3 | 1340 | 1290 | 200 | 150 | 472 |
| 1 | formaldehyde homopolymer acetylized. | 0.69 | 8.9 | Cop. TO/EO/BDGE 98/1.8/0.2 | 0.2 | 0.1 | Cop. ethylene EA (65/35) | 15 | — | −10 | 0.5–5 | 5 | 1600 | 2150 | 500 | 200 | 32 |
| 2 | " | 0.69 | 8.9 | Cop. TO/EO/BDGE 97/2.4/0.6 | 0.01 | 0.5 | polytetrahydro- | — | 40,000 | −79 | 0.1–2 | 2 | 1610 | 2150 | 200 | 175 | 25 |
| 3 | Cop. TO/EO (98/2) | 0.73 | 9.0 | Cop. TO/EO/MGF 97.9/2/0.1 | 0.08 | 1.0 | Cop. ethylene vina (68/32) | 24 | — | −15 | 0.2–2 | 3 | 1410 | 1440 | 500 | 230 | 21 |
| 4 | Cop. TO/DO (97/3) | 0.70 | 9.1 | POM I | 0.77 | 1.0 | Cop. AD/PO (80/20) | — | 50,000 | −70 | 0.5–5 | 5 | 1360 | 1390 | 500 | 185 | 15 |
| 5 | Cop. TO/EO (98/2) | 0.64 | 27.0 | POM II | 1.0 | 1.0 | polyethylene oxide | — | 30,000 | −67 | 0.5–5 | 3 | 1400 | 1490 | 200 | 195 | 7 |
| 6 | Cop. TO/DO (97/3) | 0.70 | 9.1 | POM III | 0.1 | 1.0 | Cop. butadiene-AN (80/20) | — | 30,000 | −45 | 0.5–5 | 3 | 1420 | 1460 | 200 | 145 | 10 |
| 7 | Cop. TO/EO (92/2) | 0.64 | 27.0 | Cop. TO/EO/BDGE (98/1.35/0.05) | 1.0 | 1.0 | polyethyl- | — | 40,000 | −80 | 0.5–5 | 0.6 | 1440 | 1490 | 500 | 120 | 42 |
| 8 | Cop. TO/EO (73/2) | 0.73 | 9.0 | Cop. TO/EO (98/1.9/ | 0.4 | 1.0 | polyethylene | — | 60,000 | −80 | 0.5–5 | 0.3 | 1440 | 1460 | 500 | 127 | 19 |

25 g of the polymer were melted at 190°C, together with 200 mg of 1,4-diazabicyclo[2,2,2]octane. Within a lapse of 3 minutes 300 mg of 4,4'-diisocyanatodiphenyl-methane were added in small portions. The viscosity of the melt heavily increased during this processing phase. After another 3 minutes, the reaction was terminated. Due to the high degree of crosslinking, the RSV could not be measured any more. The $i_2$ value amounted to 0.5 g/10 min.

We claim:

1. A thermoplastic molding composition consisting essentially of a mixture of
   A. 99.9 to 90 percent by weight of a mixture of
      a. 99.999 to 90 percent by weight of linear poly(oxymethylene) having chemically stabilized end groups and
      b. as a nucleating agent therefor 0.001 to 10 percent by weight of a branched or crosslinked poly(oxymethylene), and
   B. as an additional modifying component, 0.1 to 10 percent by weight of a polymer having an average molecular weight of from 1,000 to 1,000,000, the softening point of which is below the crystallite melting point of the poly(oxymethylene) of (a) and the second order transition temperature of which is −120° to +30°C, said additional component being present in the mixture as particles having diameters of from 0.1 to 5 microns, the weight percentages of (a) and (b) being calculated on the sum of (a) and (b), and the weight percentages of A) and B) being calculated on the sum of A) and B).

2. The thermoplastic molding composition as defined in claim 1 wherein the linear poly(oxymethylene) (a) is represented by a polymer selected from homopolymers of formaldehyde, homopolymers of trioxane, and copolymers of trioxane with at least one compound reacting monofunctionally and being copolymerizable with trioxane.

3. The thermoplastic molding composition as defined in claim 1 wherein the linear poly(oxymethylene) (a) is a copolymer of 99.9 to 80 weight percent of trioxane with 0.1 to 20 weight percent of a compound selected from cyclic ethers having from 3 to 5 ring members and cyclic acetals, other than trioxane, having from 5 to 11 ring members.

4. The thermoplastic molding composition as defined in claim 1 wherein the linear poly(oxymethylene) (a) is a copolymer of 99.9 to 80 weight percent of trioxane with 0.1 to 20 weight percent of a linear polyacetal.

5. The thermoplastic molding composition as defined in claim 1, wherein the nucleating agent (b) is a copolymer of trioxane with at least one compound reacting multifunctionally and being copolymerizable with trioxane, or a copolymer of trioxane with at least one compound reacting monofunctionally and copolymerizable with trioxane and at least one compound reacting multifunctionally and copolymerizable with trioxane.

6. The thermoplastic molding composition as defined in claim 5, wherein in the nucleating agent (b) the multifunctionally reacting compound is selected from the group consisting of alkyl glycidyl formal having the formula IV

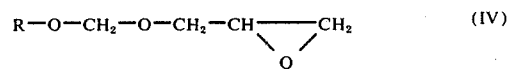

wherein R represents an aliphatic alkyl radical having from 1 to 10 carbon atoms; polyglycol diglycidyl ether having the formula V

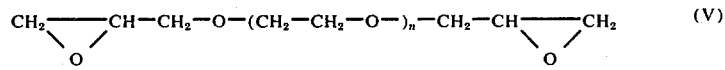

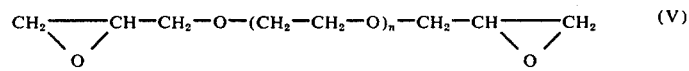

wherein $n$ represents an integer from 2 to 5; alkanediol diglycidyl ether having the formula VI

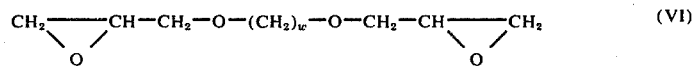

wherein $w$ represents an integer from 2 to 6; and bis-(alkanetriol)-triformal having the formula VII

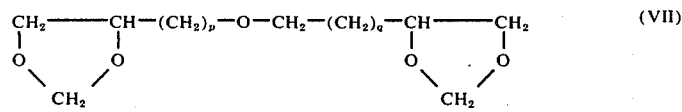

wherein $p$ and $q$ represent each an integer from 3 to 9.

7. The thermoplastic molding composition as defined in claim 1, wherein the nucleating agent (b) is branched or crosslinked poly(oxymethylene) obtained by branching or crosslinking reactions with a linear poly(oxymethylene) having lateral or chain-linked functional groups.

8. The thermoplastic molding composition as defined in claim 1, wherein the nucleating agent (b) is a branched and crosslinked poly(oxymethylene) obtained by copolymerization of trioxane with at least one compound reacting monofunctionally and being copolymerizable with trioxane and with a branched or crosslinked polyether, or by reaction of a linear poly- (oxymethylene) with a branched or crosslinked polyether.

9. The thermoplastic molding composition as defined in claim 1, wherein the nucleating agent (b) is a copolymer obtained by a reaction of a linear poly(oxymethylene) with a branched or crosslinked polyether.

10. The thermoplastic molding composition as defined in claim 1, wherein the additional modification component (B) is present in a concentration of from 0.1 to 5 percent by weight, and wherein component (B) is a polymer having an average molecular weight from 1,000 to 300,000, a softening point from +50° to 160°C, a second order transition temperature of from −80° to 0°C, and is present in the mixture as particles having diameters from 0.1 to 3 microns.

11. The thermoplastic molding composition as defined in claim 1, wherein component (B) is a homopolymer or copolymer of an olefinically unsaturated compound having the formula

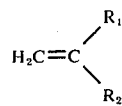

wherein $R_1$ is a hydrogen atom or a methyl radical, and wherein $R_2$ represents a hydrogen atom, a carboxylic group, an alkylcarboxy group having from 2 to 10 carbon atoms, an acyloxy group having from 2 to 5 carbon atoms, or a vinyl radical.

12. The thermoplastic molding composition as defined in claim 1, wherein component (B) is a homopolymer or a copolymer of a cyclic ether.

13. The thermoplastic molding compositions as defined in claim 1, wherein component (B) is a polyester.

* * * * *